Figure 1:
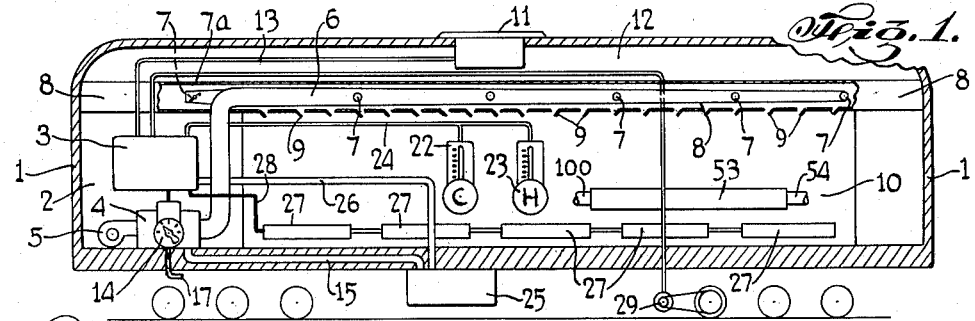

Aug. 5, 1941.    O. A. ROSS    2,251,376

AIR CONDITIONING SYSTEM

Filed Aug. 19, 1937    2 Sheets-Sheet 1

INVENTOR
Oscar A. Ross.

Aug. 5, 1941.　　　　O. A. ROSS　　　　2,251,376
AIR CONDITIONING SYSTEM
Filed Aug. 19, 1937　　　2 Sheets-Sheet 2

INVENTOR
Oscar A. Ross.

Patented Aug. 5, 1941

2,251,376

UNITED STATES PATENT OFFICE 2,251,376

AIR CONDITIONING SYSTEM

Oscar A. Ross, New York, N. Y.

Application August 19, 1937, Serial No. 159,951

2 Claims. (Cl. 257—3)

This invention relates to conditioning of air in enclosed spaces wherein it is desired to maintain the air within a predetermined normal temperature range and refers more particularly to the conditioning thereof in accord with variations in atmospheric temperatures both above and below said desired normal temperature range.

Whereas the air in all forms of enclosed spaces, wherein the temperature thereof is affected by variations in temperature of outside atmosphere, may be conditioned by this invention, it has been shown as adapted for use on moving vehicles as, for example, a railway coach which may travel from a territory of comparatively high atmospheric temperature to another territory having comparatively low similar temperature within a comparatively short space of time, therefore requiring the temperature of said coach to be lowered while in the territory of comparatively high atmospheric temperature and raised while in said territory of comparatively low atmospheric temperature, for the purpose of maintaining said enclosed space within said desired normal temperature range, and this invention accomplishes the aforenamed desired result by varying the amount of heat and cold conditioning supplied to enclosed spaces in accordance with variation of the atmosphere affecting said spaces, said variable supply being also controlled by the variation of temperature within said spaces whereby improper adjustment or partial failure of the system will not produce an abnormal temperature condition either above or below said desired normal temperature range.

In air conditioning systems where artificial refrigeration is employed for cooling circulated air of enclosed spaces, the residual cold effect in the cooling unit, after a cold thermostat has acted to cancel operation of said refrigerating system, is sufficient to produce a temperature within said spaces considerably below said desired normal temperature range, said abnormal cold condition, especially under comparatively warm exterior atmospheric conditions, being very noticeable and often objectionable when passing from one temperature to the other. This invention overcomes the aforenamed difficulty by varying the cold effect or temperature of the refrigerant in the cooling unit in proportion to variation in temperature of outside atmosphere whereby said cold effect is comparatively mild when the temperature of the atmosphere is but slightly above the temperature of an enclosed space and said cold effect is gradually increased in temperature as said atmospheric temperature increases.

When heating railway coaches or other enclosures by a heated liquid, and even though the supply of said liquid is turned on and off by atmospheric control, upon establishing flow of the heated liquid to the heating system, the residual heat effect of the heaters after said thermostatical control has acted to cut off the heat supply, especially in mild weather, is sufficient to abnormally overheat said spaces, causing discomfort to the occupants thereof, and this invention overcomes this objection by supplying heat to said spaces in quantities varied in accord with the variation in temperature of the outside atmosphere surrounding or affecting said spaces whereby they may be maintained within said desired normal temperature range.

The invention further comprehends automatic changeover from cold conditioning to heat conditioning of air for maintaining said desired normal temperature range in enclosed spaces affected by change in atmospheric temperature, whereby said desired normal temperature range may be maintained at all times, irrespective of the presence of abnormal or sub-normal conditions of atmospheric temperature affecting said spaces.

The invention further comprehends furnishing novel and peculiar apparatus wherein a device responsive to variations in temperature of atmosphere acts to supply varied cold conditioning of air in an enclosure during variation of said atmosphere extending above said desired normal temperature range and supplying variable heat conditioning of said air during temperature variation of said atmosphere extending below said desired temperature range. The invention further comprehends the use of an internal combustion motor for operating a compressor included in a refrigerant circulating system and also operating an electric generator for supplying heat and light to said enclosure, said internal combustion motor including a liquid cooling system, the heated liquid of which is circulated for heat conditioning the air of air-conditioned enclosures, the amount of heat supply therefrom being varied in accord with variations in atmospheric temperature affecting said enclosures, and the flow of said heated liquid being also controlled in response to the temperature thereof jointly with said atmospheric control, the invention further including means for selectively controlling the flow of said cooling liquid between said heating system and a radiator associated with said internal combustion motor and located exterior of said spaces.

The invention further comprehends varying the temperature of the refrigerant in an air-cooling system for enclosed spaces in accord with variations in temperature of atmosphere affecting said spaces for preventing inherent abnormal effect by a refrigerant cooling unit after a cold thermostat has acted to cancel refrigeration.

The invention further comprehends effecting cold condition of air in enclosed spaces for fixed intervals of time alternately with cancelling said cooling effect for variable intervals of time, said variable intervals being varied in accord with variations in atmospheric temperature affecting said spaces.

The invention further comprehends the use of an internal combustion motor driven, clutch coupled refrigeration unit or compressor wherein the speed of said motor is controlled jointly by a centrifugal governor and a clutch connecting and disconnecting mechanism for pre-opening the throttle valve to pre-fuel said motor before fully engaging said clutch whereby stalling of said motor is prevented, or as an alternative, closing the by-pass valve in a two-stage refrigeration compressor jointly with opening said throttle valve, said throttle valve being initially opened to pre-fuel said motor before said by-pass valve is closed for loading said compressor.

The invention further includes various novel and peculiar control circuits and devices operated thereby, including auxiliary power supply for operating a refrigerant circulating system in event of failure of the normal operating unit therefor, or under conditions where it would be inadvisable to operate said normal operating unit, as for example, a hydro-carbon motor.

Figure 2:
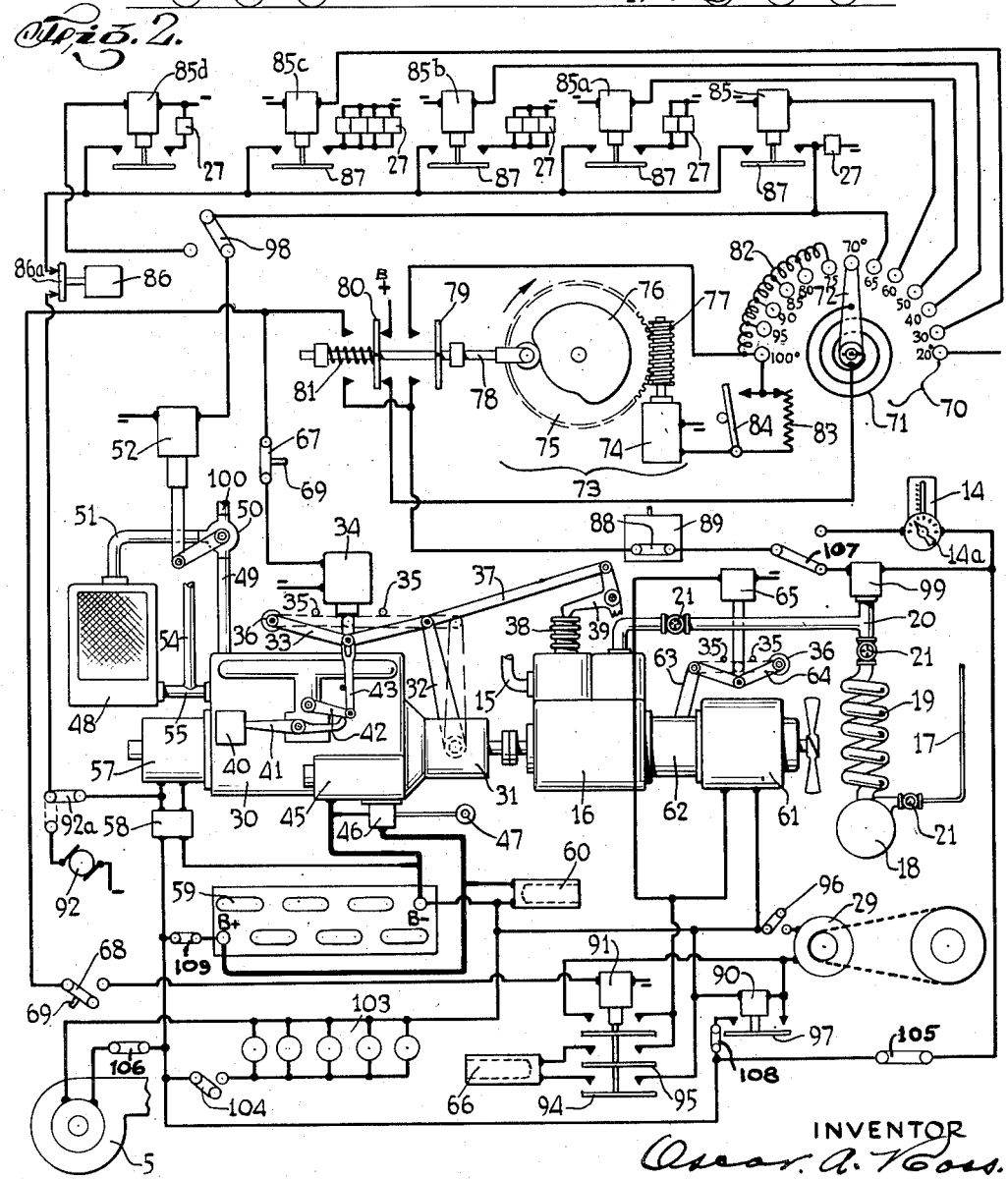
Figure 3:
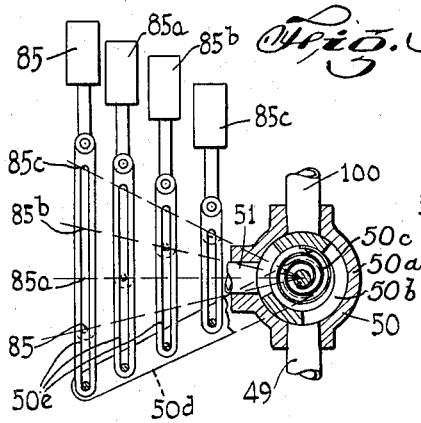
Figure 4:
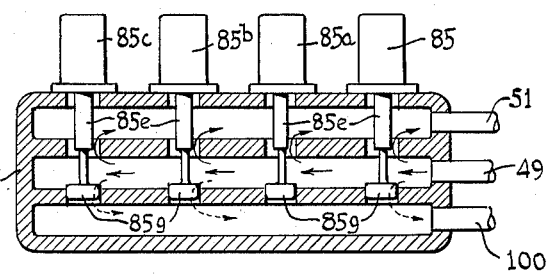
Figures 5, 6:
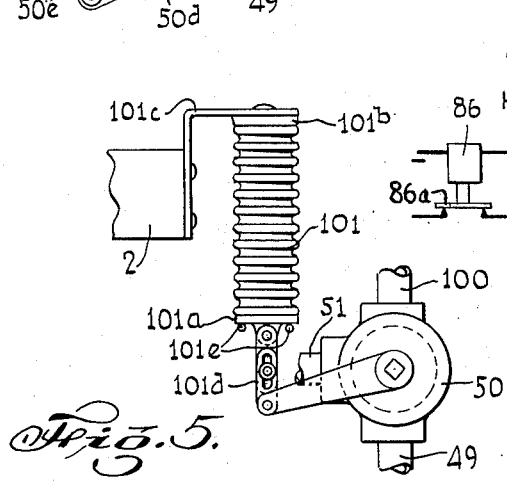
Figure 7:
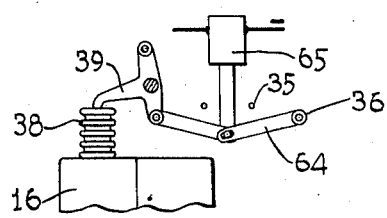
Figure 8:
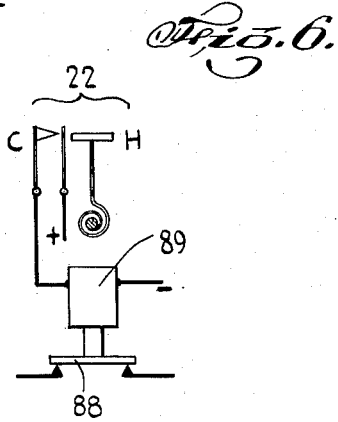
Figure 9:
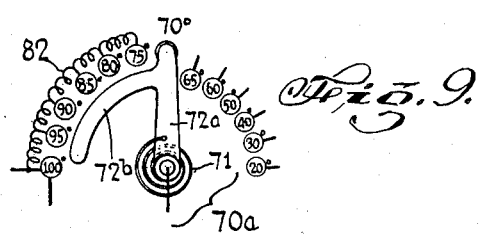

Other advantages of the invention will appear as the description thereof progresses, and the novel and peculiar features thereof will be pointed out herein, and in which:

Fig. 1 is a diagrammatic side sectional view of a railway coach or car to which the invention has been applied for illustration. Fig. 2 is a diagrammatic view showing the various control circuits, apparatus and control devices employed in the invention. Fig. 3 is a part plan view of a modified means for circulating the cooling liquid of a hydro-carbon motor. Fig. 4 is still another modified view similar to Fig. 3. Fig. 5 is a diagrammatic view of a modified form of heat effect atmosphere control. Fig. 6 is also a diagrammatic view of part of the system including an emergency heat supply system. Fig. 7 shows a part modified form of apparatus. Fig. 8 is a detail circuit plan. Fig. 9 is a view showing a modified form of thermostat.

Referring to Figs. 1 and 2 car or passenger coach 1 includes control room or compartment 2, having control panel 3, air-cooling and conditioning unit 4, including an expansion valve and thermostatic switch unit 14, said unit including a lever 14a, for varying the temperature at which said unit acts to open and close the circuit controlled thereby. Blower 5 establishes flow of air partially from within car 1 and partially from atmosphere, through cooling unit 4, to distributing duct 6, and thence through adjustable openings 7, into discharge duct 8, having louvers 9, through which the air is discharged into passenger compartment 10. Atmospheric responsive unit 11, preferably secured to the deck or roof of car 1, and extending into caloric insulating chamber 12, is connected to control panel 3 by conduit 13, enclosing conductors there between. Cooling unit 4, discharges refrigerant gas through line 15 to compressor 16 and receives liquid refrigerant from reservoir 18 through line 17, said reservoir being connected to condenser 19, receiving compressed refrigerant gas from compressor 16 through high pressure line 20, shut-off valves 21, controlling the flow of said liquid during test or disconnection of said line.

Car 1 also supports thermostat 22, arranged to close a circuit through relay 88 upon a predetermined rise in temperature above a desired normal temperature in said car and thermostat 23, arranged to close a circuit through relay 89 upon a predetermined lowering of temperature below said desired normal temperature, said thermostats being connected to control panel 3 by conduit 24 for enclosing the conductors there between. Said car also includes power operated refrigeration unit 25, preferably supported thereinunder connected to control panel 23 by conduit 26. Said car also includes heaters 27, comprising a plurality of electrical heating units each arranged to be connected in multiple for heating the car enclosure, said heaters being connected to panel 3 by conduit 28 for enclosing the conductors there between.

Power operated refrigeration unit 25 supports hydro-carbon motor 30, driving compressor 16, through clutch 31, engaged and disengaged by lever 32 when toggle 33, is raised and lowered, being shown in the lowered or disengaged position, said toggle being raised by magnet 34, against the stop 35, upon energization of said magnet. One end of toggle 33, pivots on fixed pin 36, and the other end is pivotally connected to lever 32, said last-named pivotal connection also being connected to link 37 for depressing diaphragm 38 through bell crank 39 when magnet 34 is de-energized. Corrugated diaphragm 38 is arranged to hold the compression valve (not shown) of compressor 16, in open position when said diaphragm is depressed, in this manner cancelling the operation of compressor 16, to circulate refrigerant, said valve being closed for building up pressure of said refrigerant in said compressor when said diaphragm is released. When compressor 16, is normally operating, the refrigerant gas in the refrigerant circulating system is withdrawn from cooling unit 4 through line 15 to said compressor wherein it is compressed and discharged through high pressure line 20 to condenser 19, said high pressure gas condensing into a liquid which is stored in reservoir 18, said liquid being discharged through line 17 to the expansion valves in cooling unit 4, where said liquid is expanded into a gas for producing cold effect in said unit.

Hydro-carbon motor 30, also includes a governor control unit 40, and lever 41, operated thereby for moving throttle valve 42, between idle and full load positions, said governor control unit acting to maintain a correct speed of said motor at all times. Throttle valve 42 is also actuated by toggle 33, through link 43, said link acting to open said throttle valve a predetermined amount upon the raising of said toggle for pre-fueling said motor prior to full engagement of clutch 31, or prior to the closing of the compression valve actuated by diaphragm 38, said link being slotted as shown to permit further continued opening of said throttle valve by governor lever 41, as the load of compressor 16, is taken up by motor 30.

Motor 30 also includes a conventional starter 45, including magnetically operated starting switch 46, and starting button 47, the latter being preferably mounted on panel 3. Said motor also includes liquid cooling radiator 48, normally receiving hot liquid from line 49, three-way valve 50, and line 51, said valve actuated by magnet 52, being arranged to direct flow of said hot liquid to said radiator when said magnet is de-energized, and direct said flow to hot water heater 53 in car 1 through line 100, and thence to said motor through line 54 when said magnet is energized, said liquid being returned from radiator 48 to motor 30, through line 55.

Said motor also drives generator 57, preferably secured thereto, for furnishing energy through cut-out 58, of known form, for charging battery 59, and energizing various other circuits and devices when connected thereto, said cut-out acting to disconnect said generator from said battery when motor 30 is idle or below normal speed, at which time battery 59 normally supplies energy to said circuits and devices. Said battery may be charged from an exterior source through plug connector 60.

Referring to Fig. 3 showing a modified form of heat supply for car 1, three-way valve 50 includes three-way housing 50a rotatively supporting valve member 50b normally closing outlet to line 100 and connecting lines 49 and 51, said valve member being connected to pivotally supported lever 50d by a thermostatic member 50c for rotating said valve member clockwise upon increase of heat in the circuiting liquid and counter-clockwise upon decrease in heat thereof independently of the movement of said lever 50d. Relays 85, 85a, b and c are each arranged to raise lever 50d a predetermined increasing distance through slotted members or links 50e, each of said links engaging a pin, each of said pins being positioned at an increased radii on said lever 50d. As each of said relays 85, 85a, b and c are successively energized, lever 50d is successively raised to the dotted radial positions 85, 85a, b and c shown for increasingly shunting the flow of hot circulating liquid from motor 30 away from cooling radiator 48 to heating radiator 53, the amount of shunted liquid to said heating radiator 53 also being varied in accord with the temperature thereof, an increase of temperature acting to shunt less liquid to said radiator and a decrease of temperature thereof acting to shunt more liquid to said radiator independently of the position of lever 50d except during the closed positions of said valve at which time said valve member is moved in response to said temperature variations but does not permit flow of said circulating liquid to said heating radiator 53.

Referring to Fig. 4 showing another modified form of heat supply for car 1, relays 85, 85a, b and c, are fixed to valve body 50f and upon successive energization thereof as hereinbefore described, the armatures 85c thereof are successively raised thereby also raising valves 50g successively, thereby gradually increasing the shunting of hot circulating liquid from motor 30 away from line 51 to line 100. As shown relays 85 are assumed to be de-energized, the liquid flowing as shown by the solid arrows from line 49 to line 51. Upon successively energizing said relays the liquid will flow from line 49 to line 100 and thence to heating radiator 53 as shown by the dotted arrows.

Referring to Fig. 5 showing a modified form of atmosphere control for supplying heat to car 1, the operating lever of valve 50 is connected to the free end 101a of diaphragm 101 by adjustable link 101d, the other end 101b of which is fixed to bracket 101c secured to car body 2 exterior thereof, said diaphragm being filled with an atmosphere affected liquid for expanding said diaphragm upon increase of temperature and contracting the length of same upon decrease of said atmospheric temperature. The free end 101d of diaphragm 101 normally rests on stops 101e and no movement thereof is effected until the temperature of atmosphere falls to substantially 65° F., or lower, at which time said diaphragm will contract in length to raise link 101a and said valve lever for variably shunting the hot circulating liquid from motor 30 away from cooling radiator 48 to heating radiator 53, and said shunting will be varied in accord with variations in said atmospheric temperature extending below said desired normal temperature range, said shunting also being varied in proportion to the temperature of said circulating liquid as described in connection with Fig. 4. When employing the heat supply control shown in Fig. 6, one or more or all of the heat supply contacts as 65°, 60°, 50°, 40°, 30°, and 20°, may be omitted from the atmosphere responsive thermostat 70.

Referring to Fig. 6, a hot thermostat 23, in addition to opening the heat control circuits by relay 86, also includes an under-heat contact closed in response to a lowering of temperature in car 1 below said desired normal temperature range, said under-heat contact closing a circuit from battery 59 to energize emergency heating system relay 102 and indicator 102a as shown. Said emergency heating system comprises steam or electric supply line 102b from the locomotive or other remote source effecting movement of vehicle 1, valve or switch control unit 102c and steam or electric radiators 102d receiving energy through distribution line 102e, said emergency heat supply being called into operation solely during extremely low atmospheric conditions affecting car 1 and when said normal heating systems are inadequate to supply sufficient heat for maintaining the temperature within car 1 within said desired normal temperature range. Upon a predetermined lowering of temperature in car 1 below said desired normal temperature range, cold thermostat 23 acts to close the cold contact C thereby energizing relay 102 and indicator 102a. Upon energizing said relay, valve or switch control unit C acts to supply energy from line 102b to line 102e and thence to heating system 102d and upon restoration of said desired normal temperature range within car 1, thermostat 23 acts to cancel supply of said emergency heat.

Referring to Fig. 8 showing control of relay 89 by cold thermostat 22, upon a lowering of temperature in car 1 below said desired normal temperature range, the thermostatic element of thermostat moves to the left thereby closing a circuit from battery 59 to relay 89 which when energized acts to raise circuit closer 88 thereby opening the refrigeration control circuit as more fully hereinafter described.

Referring again to Fig. 6, the indicator 102a is preferably placed in the cab of the locomotive or other vehicle effecting movement of car 1 for the purpose of notifying the operator thereof of the necessity for supplying energy to said emergency heating system. It has been found that under average temperature variations of outside atmosphere in temperate zones and where railway traffic is more general, that the energy supplied by hydro-carbon motor 30 for both cooling and heating car 1 is sufficient to meet said average atmospheric temperature change, and since extremely low atmospheric temperature conditions are rare it is preferred to employ an emergency heating system as described for this purpose.

Refrigerant compressor 16 may be driven by electric motor 61 through clutch 62, engaged and disengaged by lever 63, actuated by toggle 64, operated by magnet 65, said motor being energized either by car-driven generator 29, or from an exterior source connected to plug connector 66 as more fully hereinafter described.

Atmosphere responsive unit 11 includes thermostatic circuit controller 70, comprising thermostatic member 71, arranged to rotate thermostatic lever 72 clockwise on decrease of atmospheric temperature and counter-clockwise in increase thereof, it being assumed the temperature affecting thermostatic member 71, is 70 and therefore, lever 72, engages the 70° contact, and under which conditions both the air-cooling and heating systems are non-operative and the operation of blower 5, will merely act to re-circulate the air in car 1, together with such portion of new air as may be added by said blower, as hereinafter more fully described.

The atmosphere control apparatus further includes time interval apparatus 73, comprising motor 74, arranged to rotate gear drum member 75, including cam 76, through worm 77, cam 76 actuating circuit controller 78, including closers 79 and 80 from one contacting position to another, said circuit closers being normally urged to the right by spring 81, as shown. The speed of motor 74, in addition to thermostatic rheostat or resistance 82, is also controlled by adjustable resistance 83 and switch 84, as more fully hereinafter described. Motor 74, including parts 75 to 84 inclusive, are preferably housed in control panel 3.

Relays 85—85c supply increasing amounts of energy from generator 57 to heaters 27 upon successive energization of said relays and raising of circuit closers 87 operated thereby providing the circuit closers 86a have not been opened by relay 86 controlled by hot thermostat 22 due to abnormal condition in car 1.

Car 1 also supports car axle driven generator 29, which may form part of the car equipment when this invention is applied thereto. Cut-out relay 90, energized by generator 29, when switch 96 is closed, will raise circuit closer 97 when the voltage of said generator is up to normal. Relay 91 is controlled by time interval device 73 for periodically energizing motor 61 when circuit closers 94 and 95 are raised upon energizing said relays, and said motor 61 may be energized selectively by generator 29 or from an exterior source connected to plug connector 66, said exterior source being employed when said car is stationary and under which conditions generator 29 will also be stationary. It is to be noted that heaters 27 are connected to generator 57 therebetween and cutout 58 for the purpose of preventing complete discharge of battery 59 in event hydro-carbon motor 30 is not operating. Heaters 27 may be also energized from an exterior source 92, by movement of switch 92a which may be a generating set on the locomotive which may be drawing said car.

*Operation*

Assume the desired normal temperature range to be maintained within car 1 extends from 68° to 72° and that the atmospheric temperature surrounding said car is substantially 70°. Under these conditions the thermostatic lever 72 will be positioned on the isolated contact 70° and under which condition the operation of both the air heating and air cooling systems will be cancelled. Assume the last movement of thermostatic lever 72 was from the 75° contact to the 70° contact. Upon movement of said lever to said 70° contact, the circuit to motor 74 will be opened. Assuming, however, that cam 76 was holding circuit closer 78 in the left position, energy would have been supplied to motor 74 from battery 59 through a shown circuit closed by circuit controller 79 and adjustable resistance 83 solely, thereby continuing the operation of said motor until cam 76 had moved to permit circuit controller 78 to move to the right at which time said circuit would be opened by said circuit closer 79 and said motor stopped. It is to be noted that each time circuit closer 78 is moved to the left by cam 76, this same or fixed interval circuit is established through circuit closer 79, thereby always producing the same speed of motor 74 while this circuit is established. The speed of rotation and length of cam 76 is preferably proportioned to hold circuit controller 78 at left position a period of time slightly longer than the period required to reduce the temperature of cooling unit 4 sufficiently to actuate thermostat 14, or pressurestat 99, whichever is selected for control under maximum temperature conditions of the heated atmosphere for which the system is adjusted, it being assumed the maximum temperature is 100° Fahrenheit.

Adjustable resistance 83 is employed in part for balancing the operation of the system.

Assuming the atmosphere temperature has increased from 70° to 75° and that thermostatic lever 72 has moved counterclockwise to the 75° contact shown. Energy from battery 59 will be supplied to the refrigeration control circuit through circuit closer 80 in position shown, thermostat lever 72, rheostat 82, resistance 83, motor 74, and thence to battery. Energization of motor 74, will cause cam 76 to rotate clockwise, said motor rotating comparatively slow due to all of rheostat 82 being in series therewith. After cam 76 has rotated sufficiently to operate circuit controller 78, to the left, circuit closer 80 will establish a circuit from battery 59 through switch 14 or pressurestat 99, whichever is employed, and assuming the circuits through both are closed, thence through cold thermostat controlled relay contact 88, after which said circuit branches, one branch going through circuit controller 79 and thence to resistance 83 and motor 74 and thence to battery, and the other branch going to circuit closer 80, thence to magnet 34, returning to battery 59. Motor 74 now operates at fixed speed and simultaneously magnet 34 raises toggle 33 thereby first pre-fueling motor 30 and then engaging clutch 31 through lever 32 and simultaneously releasing by-pass valve of compressor 16 by raising corrugated diaphragm 38 whereby said compressor becomes operative to circulate the refrigerant in the refrigerant cooling system, as hereinbefore described, said circulation acting to decrease the temperature of cooling unit 4 whereby the air directed therethrough by blower 5 will be cooled thereby. Assuming cooling unit 4 by reason of heat transfer from the air passing therethrough has assumed a temperature of approximately 70° F., and therefore absorbs all the refrigerant delivered thereto, cam 76 will rotate to move circuit controller 78 to the right, thereby de-energizing magnet 34 and again inserting rheostat 82 into the circuit of motor 74 before cooling unit thermostat unit 14 or pressurestat 99 can act to open said refrigeration control circuit. However, the mean temperature of said cooling unit has been lowered sufficiently to lower the temperature of the air circulated therethrough to a temperature which when discharged into car 1 will be substantially 70°. Before the air in car 1 can be appreciably affected by the outside atmospheric temperature, cam 76 will again have rotated to move circuit controller 78 to the left, thereby repeating the first-named cooling cycle, said cycle being repeated as long as thermostat lever 72 remains on said 75° contact.

Assuming again that the atmospheric temperature affecting unit 11 has increased successively in five degree steps. At each five degree increment of rise in said atmospheric temperature, a portion of rheostat 82 will be cut out, thereby successively shortening the variable time interval at which circuit controller 78 remains at right position, and thereby also shortens the period during which the air delivered by blower 5 acts to reduce the temperature of cooling unit 4. Therefore, the mean temperature of said cooling unit will gradually become lower at each of said steps, until at 100° F., said variable interval will be so short and the mean temperature of said cooling unit so low, that the cooling thereof, during the fixed intervals of operation, and when circuit controller 78 is at left position, will be so rapid that pressurestat switch 99, or thermostatic switch 14, whichever is employed, will act to open the circuit to magnet 34, thereby cancelling the operation of compressor 16, before cam 76 acts to move circuit controller again to the right for so doing.

From the foregoing it will be seen that the mean temperature of cooling unit 4, as well as the frequency at which said unit is cooled for cooling the air delivered by blower 5 is varied in accord with variations in temperature of the atmosphere exterior to car 1. It will also be noted that the intervals during which cold effect is produced in cooling unit 4, are predetermined by time interval apparatus 73 for all atmospheric temperatures except the highest bracket thereof wherein said intervals are varied in proportion to the temperature or pressure of the circulating refrigerant in said cooling system.

Assume that car 1 is positioned at a location where it is undesirable to operate internal combustion motor 30, or that the same, for some reason or other, cannot be operated, and that an exterior or auxiliary source of electrical energy has been connected to plug connector 66. It is to be understood that switches 67 and 68 are inter-connected by connecting member 69, whereby the opening of switch 67 will close the switch 68. Switch 67 is now thereby closing switch 68 and assuming that said refrigerant control circuit has been established and that circuit controller 78 has been moved to the left, relay 31 will be energized instead of magnet 34, said relay acting to connect said auxiliary source to motor 61 through circuit closers 94 and 95, simultaneously energizing magnet 65 for raising toggle 64 to engage clutch 62 as hereinbefore described, and whereby compressor 16 will be driven by said motor 61 instead of motor 30, and since relay 91 is subject to the same control as magnet 34, said compressor will function in the same manner as if driven by said hydro-carbon motor 30.

Again assume it is desired to employ car axle driven generator 29 for supplying energy to drive motor 61 instead of hydro-carbon motor 30, and under which circumstances it is also assumed car 1 is in movement and that therefore no auxiliary source could be plugged into plug connector 66. Switch 96 is closed and assuming generator 29 is being operated at a speed sufficient to generate the desired voltage, cut-out relay 90 will raise circuit closer, establishing a closed circuit between said generator 29 and motor 61, each time control relay 91 is energized for so doing as hereinbefore described and for the same purpose.

Referring again to atmosphere control unit 11, assume that instead of the atmospheric temperature being raised above 70° F., it, on the contrary, lowers to 65° and under which conditions it is desired to furnish a small amount of heat in car 1. With the atmospheric temperature at 65°, thermostat lever 72 moves to the 65° contact shown whereby a heat control circuit is established from battery through circuit closer 80, thermostat lever 72, 65° contact, selective switch 98, magnet 52 and thence to battery. Upon energizing said magnet the lever of valve 50 is raised, thereby shunting the hot circulating liquid from hydro-carbon motor 30 through line 49 and 100, to hot water radiator 53 in car 1, and thence through line 54 to said motor. The amount of hot liquid shunted through said radiator 53 may be only a part of said hot liquid circulating through motor 30, the amount being sufficient to raise the temperature within car 1 to substantially 70° when so circulated, and assuming the atmospheric temperature to be 65°.

Assuming again the atmospheric temperature has lowered to 60° and that thermostat lever 72 has moved clockwise to the 60° F. contact. The heat control circuit from battery 59 will now be established through the 60° contact and thence to circuit closer 86 and heat control relay 85, returning to battery. Upon energizing said relay the circuit closer 87 thereof will establish a heating circuit from generator 57 to one unit of each of heaters 27, shown. Assuming relay 85 to be energized, said unit being sufficient to raise or maintain the temperature of car 1 at substantially 70° when the atmospheric temperature surrounding said car is substantially 60°.

Assume again the atmospheric temperature has lowered to 50° under which conditions thermostat lever 72 will have moved clockwise to the 50° contact. Relay 85 will now be de-energized but relay 85a will become energized in place thereof in a similar shown circuit, the circuit closer 87 of said energized relay acting to connect two units of each of heaters 27 to generator 57, the heat produced by said two units being sufficient to maintain the temperature within car 1 at substantially 70° when the surrounding atmosphere indicates 50°.

Likewise if the surrounding atmosphere is lowered to 40° F., relay 85b will be energized to effect energization of three heating units in each of said heaters 27, the heat from which will be sufficient to maintain the interior of car 1 at substantially 70°. Likewise if the atmospheric temperature lowers to 30° F., relay 85c will act to energize four heating units in each of said heaters 27 and thereby maintain the temperature at substantially 70°.

It is to be understood that the heaters 27 are each composed of a plurality of heating units, each unit being successively added in multiple circuit as each of said relays 85, 85a, 85b, and 85c, are successively energized, that is relay 85 energizes one unit of each of said heaters 27, relay 85a energizes two of said units in multiple, relay 85b energizes three of said units in multiple, and relay 85c, four of said units.

Whereas heat for car 1 has been shown as initially furnished by hot liquid from internal combustion motor 30 supplied to radiator 53, said heat may be initially supplied by relay 85d upon movement of switch 98 to energize said relay instead of magnet 52.

Also if desired, the hot liquid from internal combustion motor 30 may be employed to heat water for use in the toilet rooms of car 1 by insertion of a suitable heat exchange unit in the circulating system containing said hot liquid and through which the water to said toilet room flows.

Generator 57 is preferably of a size sufficient to supply all the energy required for maximum heating of car 1 under practically all the conditions of cold weather experienced in temperate climate, and the full load condition thereof is substantially equal to the full load condition imposed by compressor 16 when driven by hydrocarbon motor 30.

It is to be understood that whereas no circuit has been shown as connected to the 20° contact that an additional relay similar to relay 85c may be energized thereby for connecting five of said heater units in multiple and that if required additional contacts similar to those shown may be employed for supplying additional heat at temperatures below 20° Fahrenheit.

Whereas cooling unit 4 has been described as solely cooling the air furnished by blower 5, other apparatus for conditioning said air for purity and/or humidity may also form part of the system and be inserted in the air flow effected by said blower 5.

Whereas heaters 27 have been shown as located within compartment 10 of car 1, said heaters may be positioned within duct 8 over louvers 9 for transfer of heat to the moving air therefrom into chamber 10, or they may be positioned within said duct 8 adjacent each of the openings 7 in duct 6 whereby the air from said openings 7 will be directed through said heaters for the heating thereof when discharged into duct 8.

Blower unit 5, in addition to recirculating the air in car 1 is also assumed to be introducing a prescribed amount of fresh air from atmosphere to duct 6 during the operation thereof.

It is to be noted that the circuit for heaters 27 is connected to the generator 57 independently of cut-out 58. This is for the purpose of preventing complete exhaustion of battery 59 in event of failure of hydro-carbon motor 30 during operation of the system and at such times as the atmospheric temperature is below said desired normal temperature range, the capacity of said battery being comparatively small with respect to the maximum load conditions of heating and under which conditions any prolonged heater load thereon would exhaust the same.

Whereas a clutch 32 has been shown as connecting compressor 16 and hydro-carbon motor 30, said clutch may be omitted if desired, since the opening of the by-pass valve by diaphragm 38 when magnet 34 is de-energized will serve to cancel movement of the refrigerant by said compressor although the same is being driven by said motor. Also whereas a clutch 62 has been shown as connecting motor 61 with compressor 16, said clutch may be omitted and the rotor or armature of said motor may be permitted to rotate with compressor 16 by direct connection therewith, said rotor or armature acting as a flywheel to assist in taking up the load when said by-pass valve is closed. In event clutch 62 is omitted the free end of toggle 64 will be arranged to operate bell crank 39 similarly to the operation thereof by link 37 and toggle 33, as shown in Fig. 7.

It is to be noted that air distributing duct 6 is contained within discharge duct 8. The openings 7 of air distributing duct 6 are supplied with adjustable dampers 7a which are adjusted to deliver equal amounts of air when blower 5 is in operation, such equal distribution causing some noise owing to the restriction thereof at said openings. For this reason duct 6 is placed within discharge, or noise absorbing duct 8 from which the louvers 9 discharge the air uniformly into the interior of car 1 without perceptive noise.

Whereas the atmospheric control unit 11 has been shown as controlling both the air conditioning system and the heat supply system, said unit may be employed for controlling the air cooling system solely and the heat supply may be controlled by the apparatus as shown and described in connection with Fig. 5.

Whereas the combined air conditioning systems for both heating and cooling the air of enclosed spaces has been shown as applied to a moving vehicle, it is to be understood that the same system may be applied to fixed buildings of any form wherein it is desired to have the enclosures thereof air-conditioned.

Car 1 is also supplied with a suitable lighting system 103 energized by battery 59 when switch 104 is closed.

Manually operated switch 105 acts to cancel operation of the refrigerant circulating system control circuit when opened, and manually operated switch 106 acts to cancel operation of blower unit 5 when opened.

Switch 107 selects the manner of cancelling the operation of compressor 16, and is shown as selecting the pressurestat 99 for cancelling the operation thereof when the pressure in the refrigerant circulating system has increased sufficiently to cause the diaphragm therein to open the circuit therethrough.

Switch 109 opens the circuit between cutout 58 and battery 59.

It is to be noted that when relay 85 is energized to energize one unit of heater 27, the energization thereof also acts to continue the energization of magnet 52, or relay 85d, whichever is connected by switch 98, in the circuit shown, in this manner continuing the heat supply to car 1 from the motor circulating liquid as an addition to the heat supplied by said single unit of heater 27 energized by relay 85.

Fig. 9 shows a modified form of thermostatic device 70a, similar to device 70, the thermostatic lever 72a being modified to include contacting extension 72b arranged to bridge all the contacts as 65°, 60°, 50°, 40°, 30°, and 20°, simultaneously when said lever has been rotated clockwise to the 20° contact, thereby maintaining all of the correlated relays, as 85, 85a, b, and c, energized simultaneously and in which case each of said relays may be arranged to energize solely a single unit of heater 27 upon energizing each of said relays, the result, as far as heat supply being the same as now shown. It is to be understood that where the plus sign is shown on a circuit, said sign denotes that said circuit is connected to the positive side of battery 59 and that where a minus sign so appears, that said circuit is connected to the negative said of said battery.

What I claim is:

1. In an air conditioning system, an enclosed space requiring the temperature thereof to be maintained within a desired normal temperature range, a refrigerant circulating system including a cooling unit for cooling said space and a motor driven compressor unit for circulating the refrigerant in said system through said cooling unit, a heating system for heating said space, and thermostatic means controlling said motor driven compressor unit responsive to variations in temperature of atmosphere beyond said space for effecting circulation of said refrigerant in said cooling system for predetermined periods alternately with cancelling said circulation for other predetermined periods when said atmospheric temperature is above said desired normal temperature range, and effect operation of said heating system to heat said space when said atmospheric temperature is below said desired normal temperature range.

2. In an air conditioning system, an enclosed space requiring the temperature thereof to be maintained within a desired normal temperature range irrespective of variation in atmospheric temperature beyond said space, a refrigerant circulating system including a cooling unit for cooling said space and a motor driven compressor unit for circulating the refrigerant in said system for cooling said cooling unit, a heating system for heating said space, and thermostatic means controlling said refrigerant circulating system and said heating system responsive to said atmospheric temperature for producing periodic circulation of said refrigerant in said cooling system and varying the time interval of said circulation periods in accord with variations of said atmospheric temperature above said desired normal temperature range and rendering said heating system operative to variably heat said space in accord with variations in said atmospheric temperature below said desired normal temperature range.

OSCAR A. ROSS.